United States Patent

Kunze

[11] 4,047,283
[45] Sept. 13, 1977

[54] METHOD AND APPARATUS FOR CONNECTING INDIVIDUAL LIGHT WAVEGUIDES

[75] Inventor: Dieter Kunze, Neuried, Germany

[73] Assignee: Siemens Aktiengesellschaft, Berlin & Munich, Germany

[21] Appl. No.: 701,497

[22] Filed: July 1, 1976

[30] Foreign Application Priority Data

July 10, 1975 Germany .............. 2530883

[51] Int. Cl.² .................................................. G02B 5/14
[52] U.S. Cl. .................................... 29/466; 350/96 C; 350/81; 29/469.5; 29/761; 29/281.5; 29/283.5
[58] Field of Search ............... 29/466, 464, 469, 200 R, 29/200 P, 200 J, 600, 601, 407, 203 P, 203 J, 628, 630 R, 592; 350/96 WG, 96 R, 96 B, 96 T, 96 C, 81, 320; 269/321 N

[56] References Cited

U.S. PATENT DOCUMENTS

| | | | |
|---|---|---|---|
| 3,800,388 | 4/1974 | Borner et al. | 29/200 P |
| 3,861,781 | 1/1975 | Hasegawa et al. | 350/96 C |
| 3,885,859 | 5/1975 | Dalgleish et al. | 350/96 C |
| 3,914,880 | 10/1975 | Dakss et al. | 350/96 C |
| 3,938,895 | 2/1976 | Bridger et al. | 356/152 |

*Primary Examiner*—Milton S. Mehr
*Attorney, Agent, or Firm*—Hill, Gross, Simpson, Van Santen, Steadman, Chiara & Simpson

[57] ABSTRACT

A method and apparatus for connecting individual light waveguides characterized by providing a splicing element holder, a pair of spaced waveguide clamping devices which are spaced from the holder, securing a splicing element having a longitudinal extending centering groove with the base in the holder with the groove opening toward the clamping devices, clamping a light waveguide in each clamping device with an end portion of the waveguide extending toward the splicing element at an acute angle, moving either the holder toward the pair of clamping devices or the pair of clamping devices toward the holder to insert the ends of the pair of waveguides into the centering groove of the splicing element, to bring the end faces of the pair of waveguides into contact with each other, and to cause the end portions of the waveguides to bend and to move into the centering groove for alignment of the end portions and subsequently securing the aligned end portions in the splicing device.

12 Claims, 5 Drawing Figures

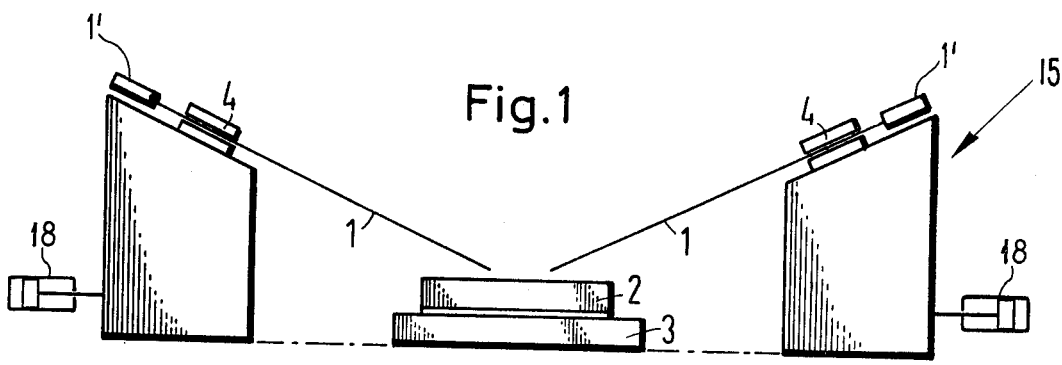
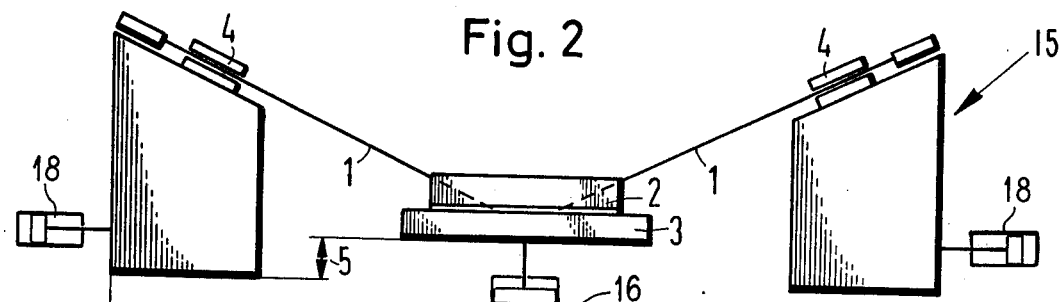
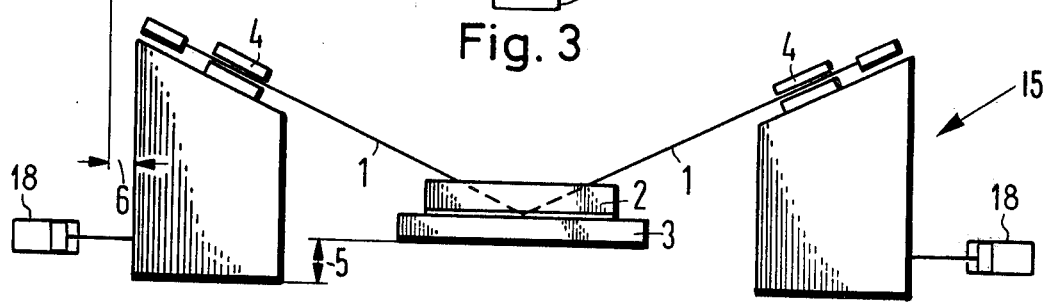
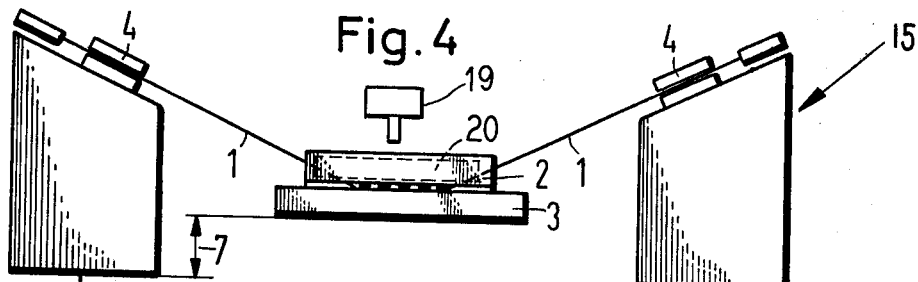
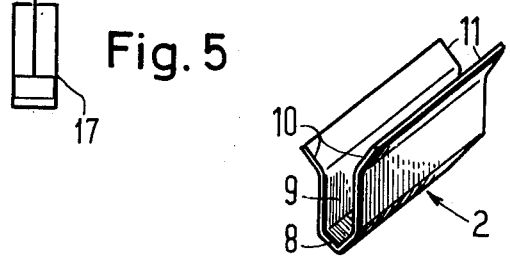

METHOD AND APPARATUS FOR CONNECTING INDIVIDUAL LIGHT WAVEGUIDES

BACKGROUND OF THE INVENTION

Field of the Invention

The present invention is directed to a method and apparatus for connecting a pair of individual light waveguides in end-to-end light transmitting relationship.

Prior Art

In order to produce an end-to-end connection between a pair of individual light waveguides, expensive apparatuses and processes are usually necessary to obtain a junction point between the end faces of the individual light waveguides which point is optically good and has the lowest possible losses. Due to the small diameter of the individual light waveguide such as optical fibers, it is often very difficult to obtain a connection point without axial misalignment and without angular deflection. Thus, necessary auxiliary means are often required and can be quite expensive to construct. As disclosed in German Offenlegungsschrift 2,237,444, electro-optical measuring methods and adjustment devices are, in part, employed in order to keep coupling losses as low as possible. Another example of a connection arrangement for end-to-end connection of optical fibers is described in U.S. Pat. No. 3,870,395 and comprises inserting the individual optical waveguides into a small capillary tube for the purpose of aligning and centering the individual waveguides. However, the inserting of individual waveguides, which have very small diameter, is very difficult and requires a great deal of skill. An assembly, which utilizes a connection arrangement with flute-type grooves, is described in German Offenlegungsschrift 2,345,273 and has similar problems. In addition, an apparatus for the adjustment of the two optical component elements is described in German Auslegungsschrift 2,159,327.

SUMMARY OF THE INVENTION

The present invention is directed to a method and apparatus for forming a connection of a pair of individual light waveguides in end-to-end light transmitting relationship which method and apparatus inserts the ends of the individual light waveguides in a centering groove of a splicing element. The method and apparatus accomplish the task of inserting the ends of the individual light waveguides in an uncomplicated manner and without requiring measurements and wherein the knowledge of a precision mechanics and assembly work, which were otherwise necessary in prior methods, are eliminated by the simple device which is easy to operate.

To accomplish this task, the method comprises providing a splicing element holder and a pair of spaced waveguide clamping devices which are spaced from the holder; securing a splicing element having a longitudinal extending centering groove with a base in the holder with the groove opening toward the clamping devices; clamping a light waveguide in each clamping device with an end portion of the waveguide extending toward the base of the splicing element at an acute angle; creating relative movement between the holder and the pair of clamping devices by moving either the pair of clamping devices toward the holder or moving the holder toward the pair of clamping devices to insert the ends of the pair of waveguides into the centering groove of the splicing element, to bring the end faces of the pair of waveguides into contact with each other, and to cause the end portions of the waveguides to bend and to move into the centering groove for alignment of the end portions therein; and then securing the aligned end portions in the splicing device either by deforming the splicing element or by applying an adhesive.

An apparatus for accomplishing the method includes a splicing element holder; a pair of spaced waveguide clamping devices; means for either moving the holder toward the pair of clamping devices or for moving each of the clamping devices toward the holder; and means for securing the aligned waveguides in the splicing element such as means for deforming the splicing element into gripping engagement or means for applying an adhesive to cement the waveguides in the splicing element.

Preferably, the method and the apparatus for accomplishing the method will include means for cutting each of the end portions of the clamped waveguide to a predetermined length.

The method may also include a step of stripping any protective sheathing or covering from the end portions of the clamped waveguide. Preferably, the apparatus utilizes a holder for the splicing element which holder has a magazine for a plurality of splicing elements and feeds them automatically to the holder.

The problems, which existed in previous methods and apparatuses for forming a connection between the ends of the individual light waveguides such as optical fibers, are overcome by the fact that after clamping of the pair of fibers with the end portions at acute angles relative to a base of the splicing element, relative movement of the clamping devices and holder lowers or inserts the ends of the fibers relatively into the centering groove and with either continuing or similar effective relative motion the two ends of the fibers are moved into contact with each other and cause deflection of the end portions which deflection lowers the end portions into the centering groove for axial alignment.

The significant feature of the inventive method is that the individual light waveguides are mutually aligned in an obtuse angle in accordance to the path of the centering groove of the splicing element and are securely fastened in this position by the clamping device or jigs. Due to the relative movement of the clamping device or jigs for each of the individual light waveguides and the holder of the splicing element, a lowering or insertion of the individual waveguides into the centering groove takes place whereby a mutual alignment is achieved and the ends of the individual light waveguides are brought into contact with one another. Due to the angle position of the feeder to the base of the groove, a combination of this relative motion causes the ends of the individual waveguides to move toward one another until they are in mutual contact. Finally, as a consequence of deflection or bending of the end portion of the individual light waveguides, they are completely lowered into the centering groove for the purpose of axial alignment.

Preferably, the necessary relative motion may take place in several motion steps. Thus, the first relative motion step moves the holder and pair of clamping devices toward each other in a first direction to insert the ends of each of the clamped waveguides into the splicing element. While maintaining the relative spacing between the splicing element holder and each of the clamping devices, the clamping devices are moved toward each other in a second direction, which is substantially perpendicular to the first direction, until mutual contact between the end faces of the fibers is obtained. Subsequent additional relative motion in the first direction causes the individual fibers to bend and be lowered into the entire length of the centering groove. This last mentioned motion produces an axial alignment of both end portions of the individual fibers. This aligned position can also be obtained by a single relative motion and it makes no difference whether the ends of the individual light waveguides are lowered or moved into the centering groove or whether the waveguides are held stationary and the splicing element is moved in the direction to receive the ends. Since a longitudinal compensation is possible due to an increasing or decreasing of the amount of deflection of the individual light waveguides, a variation in the amount of movement during the motion sequence does not disadvantageously affect the quality of the connection between the individual waveguides.

The splicing elements, which are suitable for the performance of the method, are particularly those which exhibit open centering grooves which have preferably either a U-shaped or V-shaped cross section.

The apparatus for carrying out the method is not dependent upon a specific drive mechanism for producing the necessary relative motion. The drive mechanism can for example take place by mechanical means such as a compound lever arrangement, or can be accomplished by pneumatically or electromagnetically moving either the holder or the clamping devices or jigs. In addition, it is desirable to provide the apparatus with a device for the removal of the protective sheathing on the ends of the individual light waveguides and with means for cutting the waveguides to a desired length such as a fiber breaking device. When cutting the waveguides to a length and removing the protective coating, the method will include two additional steps which will occur after the clamping of the individual waveguides in the clamping jigs or devices. The step of removing the protective sheathing and breaking the individual waveguides to a desired length can be accomplished by positioning a corresponding device to perform these two functions in a position similar to the holder for the splicing element. After performing the removal of the protective covering and cutting to length, the apparatus for performing this function is moved out of position and the holder with the splicing element is moved into the desired position relative to the ends of the waveguides.

BRIEF DESCRIPTION OF THE DRAWINGS

FIG. 1 is a schematic illustration of an apparatus for performing the method of the present invention;

FIGS. 2, 3 and 4 illustrate the device of FIG. 1 in various positions during the performance of the method; and FIG. 5 is a perspective view of the sample embodiment of the splicing element which is suitable for use in the method and apparatus of the present invention

DESCRIPTION OF THE PREFERRED EMBODIMENTS

The principles of the present invention are particularly useful in a method using an apparatus generally indicated at 15 in FIGS. 1–4 for forming a connection between a pair of waveguides 1, by utilizing a splicing element 2.

As illustrated, the apparatus 15 includes a pair of clamping devices or jigs 4 which receive individual light waveguides 1. The apparatus 15 also includes a holder 3 for holding the splicing element 2 with its centering groove opening toward the pair of waveguides 1. As illustrated, each of the waveguides have had their exterior protective sheathing or casing 1' stripped from an end portion by a prior removal step. In addition, the exposed portion of the waveguide 1, which may be an optical fiber, has been cut to the desired length.

As illustrated, each of the clamping devices or jigs 4 are disposed on opposite ends of the splicing element 2. Each of the waveguides 1 is held by its respective clamping device or jig with its end surface spaced above the splicing element 2 and in spaced relation to the end face of the other waveguide.

To create the relative movement between the clamping devices 4 and the holder 3, the holder 3 may be supported on a pneumatic cylinder 16 (FIG. 2) or each of said jigs or clamping devices 4 may be supported on relative movement means such as pneumatic cylinders 17, 17 (FIG 4). In addition, each of the clamping devices 4 is illustrated as being acted on by relative movement means such as pneumatic cylinders 18, 18 (FIGS. 3 and 4) for moving the clamping devices relative to each other.

During a first portion of the relative movement, either the cylinder 16 or the cylinders 17, 17 relatively move either the holder 3 or the jigs 4 in a first or vertical direction a distance 5 to decrease the distance between the holder 3 and jigs 4 so that the free ends of each of the waveguides 1 are inserted into the centering groove of the splicing element 2. After reaching a position such as illustrated in FIG. 2, means 18 are actuated to cause relative movement of the clamping devices 4 toward each other by a distance 6 and such movement in a second direction will move the end faces of the fibers 1 while inserted in the splicing element 2 toward each other and into contact. After obtaining contact between the end faces, the clamping elements 4 and holder 3 are again moved in the first direction an additional distance equal to distance 7 so that the portions of the fiber adjacent each end face are deflected or bent to lie in the centering groove of the splicing element 2 and in axial alignment.

To secure the aligned end portions of each of the waveguides 1 in the splicing element 2, the contact point or junction of the two waveguides is coated with a suitable adhesive such as from a dosing means 19 which applies a dose of adhesive. The securing can also be accomplished by crimping or deforming the element 2 by means 20 (illustrated in broken lines) for deforming the splicing element 2 into gripping engagement on the aligned waveguides 11.

It should be noted that when the two waveguides 1 are clamped in the clamping devices 4, they lie substantially in the plane of the centering groove of the splicing element 2 which is held on the holder 3. Thus, lateral alignment of the individual light waveguides 1 is obtained in the initial steps of the method. By moving either the support 3 upward a distance 5 in the first vertical direction relative to the clamps 4 or by lowering the position of the clamps 4 along the first direction a distance 5, the end faces of each of the waveguides is inserted into the splicing element 2. Since the individual light guides have been cut to a prerequisite length at the beginning of the operation, the point of contact in the centering groove is rather precisely defined. Since each of the fibers 1 and 2 can be deflected to compensate for any error in the length of an individual waveguide 1, the problems with tolerances are insignificant.

During the step of shifting the clamping devices 4 in a lateral direction which is perpendicular to the first direction, the end faces of the waveguides are moved into contact with each other. As during the first step of relative movement, deflection or bending of either one of the waveguides will compensate for any excess amount of movement in the lateral direction.

As described hereinabove, each of the waveguides 1 had its outer casing or covering removed from the end portion and had been cut to the desired length prior to being inserted in the clamping element. If desired, the stripping of the outer casing or covering can be accomplished after each waveguide has been clamped in the clamping devices 4. In addition, the desired length of each of the waveguides can be obtained by utilizing a fiber breaking device. In such an instance, the support 3 for the splicing element 2 is moved out of the position illustrated in FIG. 1 and a fiber breaking device is moved therein. After breaking or cutting each of the waveguides 1 to the desired length, the cutting means or fiber breaking device is removed and the holder 3 is inserted or returned to the position illustrated in FIG. 1.

The holder 3 can also include a magazine for storing a plurality of splicing elements 2 which magazine automatically feeds a splicing element 2 into the holder during the step of securing the splicing element on the holder.

An example of a splicing element which is utilized with the present method and apparatus is illustrated in FIG. 5. As illustrated, the element 2 has a longitudinally extending centering groove 9 having a V-shaped base 8. As illustrated, the element 2 is made of a thin wall material having parallel extending portions 10 which have fold lines with diverging portions 11 which form an insertion aid to facilitate insertion of the ends of the fibers into the element 2. The insertion aid will compensate for any slight lateral displacement of the clamping devices during the first part of the relative movement between the holder 3 and jigs 4.

While the preferred embodiment of the present method and apparatus was described with the relative movement being broken in three successive steps, the relative movement can be accomplished in one continuous step. For example, movement in the first direction will cause the insertion of the ends of the waveguides into the splicing element, deflecting and bending of the inserted ends as they move on the base of the groove of the splicing element 2 into end-to-end contact and continued bending to move the adjacent portions into axial alignment.

While the means for moving the clamping jigs 4 and the holder 3 for the splicing element were illustrated as pneumatic cylinders, electromagnetic means such as electrical solenoids can be utilized to accomplish the relative movement. The movement can also be accomplished by utilizing a compound lever system.

Although various minor modifications may be suggested by those versed in the art, it should be understood that I wish to employ within the scope of the patent warranted hereon, all such modifications as reasonably and properly come within the scope of my contribution to the art.

I claim:

1. A method of connecting a pair of individual light waveguides in end-to-end light transmitting relationship in a splicing element, said method comprising providing a splicing element holder and a pair of spaced waveguide clamping devices which are spaced from the holder; securing a splicing element having a longitudinal extending centering groove with a base in the holder with the groove opening toward the pair of spaced clamping devices clamping a light waveguide in each clamping device with an end portion of each waveguide extending toward the base of the centering groove at an acute angle; creating relative movement between the holder and the pair of clamping devices to insert the end of each of the waveguides into the centering groove of the splicing element, to bring the end faces of the pair of waveguides in contact with each other and to cause the end portions of the waveguides to bend and to move into the centering groove for axial alignment therein; and then securing the aligned end portions in the splicing element.

2. A method according to claim 1, wherein the step of creating relative movement between the holder and the pair of clamping devices comprise maintaining the splicing element holder in a stationary position and moving the pair of clamping devices toward the stationary holder.

3. A method according to claim 1, wherein the step of creating relative movement between the holder and the pair of clamping devices comprise maintaining each of the pair of clamping devices in a stationary position and moving the splicing element holder toward the stationary clamping devices.

4. A method according to claim 1, which includes subsequent to clamping the light waveguide in each of the clamping devices and prior to the step of creating relative movement removing a protective casing from each of the end portions of the clamped waveguide and subsequently cutting the exposed portion of the waveguides to a desired length.

5. A method according to claim 1, wherein subsequent to the step of clamping a waveguide in each of the clamping devices and prior to the step of creating relative movement cutting each of the end portions to a prerequisite length.

6. A method according to claim 1, wherein the step of securing comprises deforming the splicing element into gripping engagement on the aligned waveguides.

7. A method according to claim 1, wherein the step of securing comprises applying an adhesive material for cementing the end portions of the pair of aligned waveguides in the splicing element.

8. A method according to claim 1, wherein the step of creating relative movement between the holder and pair of clamping devices comprises subsequentially decreasing the distance between the holder and pair of clamping devices to insert the end of the waveguide in the centering groove, then moving the clamping devices toward each other to bring the end of the waveguide into contact, and then moving the holder and pair of clamping devices to further decrease the distance therebetween and to cause the bending of the end portions of the waveguides into axial alignment.

9. An apparatus for forming a connection of a pair of individual light waveguides in end-to-end light transmitting relationship in a splicing element, said apparatus comprising a splicing element holder, a pair of clamping devices, each of said pair of clamping devices holding a single waveguide with an end portion extending at an acute angle to a splicing element with a centering groove supported in the splicing element holder; means for creating relative movement between the pair of clamping devices and the splicing element holder; and means for securing the aligned waveguides in the splicing element so that after the ends of the waveguides are inserted in the centering groove, moved into contact and adjacent end portions are bent into axial alignment, the waveguides and splicing element are secured together to complete the connection.

10. An apparatus according to claim 9, wherein the means for securing comprises means for applying a dose of adhesive material to the aligned waveguides in the splicing device so that the aligned waveguides are secured therein.

11. An apparatus according to claim 9, wherein the means for securing comprises means for deforming the splicing element into gripping engagement with the aligned waveguides.

12. An apparatus according to claim 9, wherein the means for creating relative movement includes means for moving at least one of the pair of clamping devices relative toward the other clamping device and means for moving at least one of the holder and pair of clamping devices toward each other to reduce the distance therebetween.

* * * * *